Jan. 13, 1925.

F. D. WELLS

VALVE

Filed June 21, 1924

1,522,659

F. D. Wells,
INVENTOR

BY Victor J. Evans
ATTORNEY

WITNESS:

Patented Jan. 13, 1925.

1,522,659

UNITED STATES PATENT OFFICE.

FRANK D. WELLS, OF BARTLESVILLE, OKLAHOMA.

VALVE.

Application filed June 21, 1924. Serial No. 721,550.

*To all whom it may concern:*

Be it known that I, FRANK D. WELLS, a citizen of the United States, residing at Bartlesville, in the county of Washington and State of Oklahoma, have invented new and useful Improvements in Valves, of which the following is a specification.

My present invention has reference to a valve designed to be connected to pipes which conduct steam under high pressure, and my object is the provision, in a valve for this purpose, of means for cutting off nearly all of the steam before the valve is moved to its seat, and wholly cutting off the flow of steam when the valve is seated.

To the attainment of the foregoing, and other objects which will present themselves as the nature of the invention is better understood, reference is to be had to the drawing which accompanies and which forms part of this application.

In the drawing:—

Figure 1:
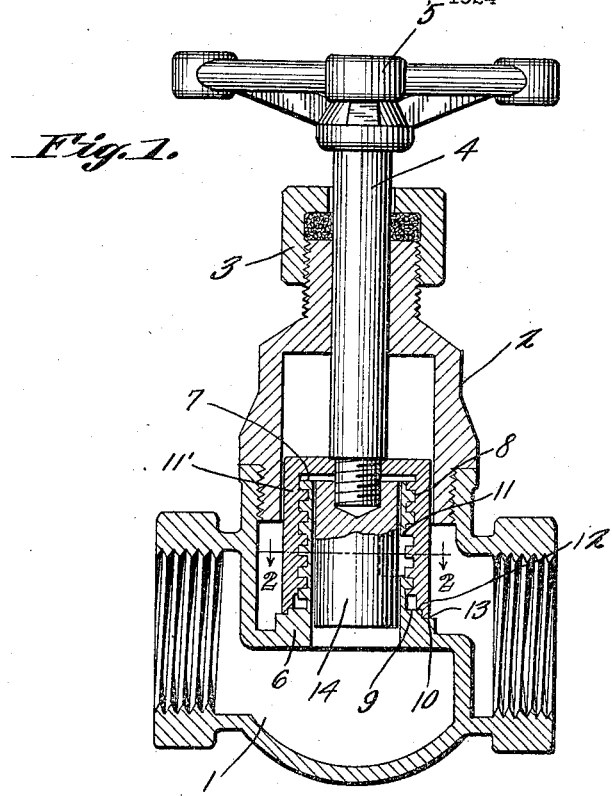
Figure 1 is an approximately central longitudinal sectional view through a valve in accordance with this invention.
Figure 2:
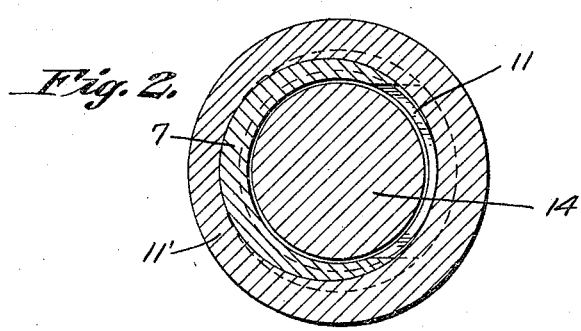
Figure 2 is an enlarged sectional view on the line 2—2 of Figure 1.

The body of the valve, indicated by the numeral 1, is exteriorly of the usual construction, the same having screwed in the top thereof a bonnet 2 on whose outer and reduced end there is screwed a waste nut 3 for the spindle 4 of the valve. The spindle 4 is operated by the usual wheel 5.

The seat, between the inlet and outlet passages of the body, materially differs from the valves of the ordinary construction. As a matter of fact, two seats are employed in the partition between the inlet and outlet ports or ends of the body. The partition is indicated for distinction by the numeral 6 and is formed with an upstanding sleeve extension 7 that is provided with exterior threads 8. The partition, below the threads, is formed with an annular depression providing an upper horizontal shoulder 9 and a lower shoulder 10. The sleeve 7 is approximately centrally provided with a port or passage 11.

Screwed on the threaded sleeve 8 there is a tubular member which I shall term a cage and which is indicated by the numeral 11'. The tubular member or cage has its lower and open end provided with an interior annular recess forming an upper shoulder 12 and a lower shoulder 13. These shoulders are designed to rest on the shoulders 9 and 10 when the cage 11 is seated.

The spindle 4 is secured to the outer and closed end of the cage 11, but passes therethrough and is connected to the top of a plug or piston 14 that is slidably received in the tubular extension 7 of the partition 6. By reference to Figure 1 of the drawing, it will be noted that the lower end of the plug or piston 14 is disposed below the lower or outer end of the cage. The plug or piston fits the bore of the sleeve 7 comparatively tight, but there is necessarily a slight opening or passage between the bore of the sleeve and the cross sectionally rounded plug or piston 14. It will be obvious that when the wheel is turned to unscrew the cage on the sleeve 7 that the lower end of the cage will reach the port 11 before the lower or outer end of the plug or piston is brought opposite the said port, and likewise that when the wheel is turned in an opposite direction the plug or piston will have its lower end arranged in the position illustrated in Figure 1 of the drawing before the cage is seated on the stepped shoulders or wheels 9 and 10 which provide the seat therefor. The result is that approximately 92% of the steam will be shut off by the plug or piston before the cage is seated, and it is thought that the foregoing description, when taken in connection with the drawing will fully set forth the construction and advantages of my improvement to those skilled in the art to which such inventions relate.

Having described the invention, I claim:—

A valve for pipes conducting steam under high pressure having a partition between its inlet and outlet ends centrally formed with an exteriorly threaded sleeve and having at the terminal of the sleeve an annular depression forming upper and lower shoulders, said sleeve having an approximately central port therethrough, a tubular interiorly threaded member comprising a cage, the threads whereof engaging the threads of the sleeve and said member having its outer end closed and its open end stepped to provide upper and lower shoulders to engage the referred to upper and lower shoulders of the partition when the cage is seated, an operating spindle for the cage, and a piston connected therewith received in the sleeve and extending beyond the shouldered end of the cage, for the purpose set forth.

In testimony whereof I affix my signature.

FRANK D. WELLS.